(12) United States Patent
Flegar et al.

(10) Patent No.: US 9,925,952 B2
(45) Date of Patent: Mar. 27, 2018

(54) DEVICE FOR CUTTING A BELT

(71) Applicant: AGUILA TECHNOLOGIE, Bidart (FR)

(72) Inventors: Matthias Flegar, Bayonne (FR); Laurent Dardinier, Ahetze (FR)

(73) Assignee: AGUILA TECHNOLOGIE, Bidart (FR)

( * ) Notice: Subject to any disclaimer, the term of this patent is extended or adjusted under 35 U.S.C. 154(b) by 76 days.

(21) Appl. No.: 14/909,231

(22) PCT Filed: Jul. 31, 2014

(86) PCT No.: PCT/FR2014/051996
§ 371 (c)(1),
(2) Date: Feb. 1, 2016

(87) PCT Pub. No.: WO2015/015125
PCT Pub. Date: Feb. 5, 2015

(65) Prior Publication Data
US 2016/0221533 A1   Aug. 4, 2016

(30) Foreign Application Priority Data

Jul. 31, 2013  (FR) ..................................... 13 57557

(51) Int. Cl.
*B26F 3/12*   (2006.01)
*B60R 22/32*   (2006.01)

(52) U.S. Cl.
CPC .............. *B60R 22/321* (2013.01); *B26F 3/12* (2013.01); *B60R 22/32* (2013.01);
(Continued)

(58) Field of Classification Search
CPC ...... B26F 3/00; B26F 3/06; B26F 3/08; B26F 3/12
(Continued)

(56) References Cited

U.S. PATENT DOCUMENTS 2,130,045 A * 9/1938 Tapparo ................. B26D 1/547
83/542
2,771,534 A * 11/1956 Schwahn ................. B26D 1/04
53/374.2
(Continued)

FOREIGN PATENT DOCUMENTS

DE          32 20 133 A1    12/1983
DE   10 2005 032856 A1     1/2007
(Continued)

OTHER PUBLICATIONS

International Search Report PCT/FR2014/051996 dated Jun. 6, 2016.

*Primary Examiner* — Kenneth E Peterson
(74) *Attorney, Agent, or Firm* — Young & Thompson

(57) ABSTRACT

A cutting mechanism (30) for a safety belt (10), the cutting mechanism (30) including a case (32), a passage (34) running through the case and making it possible to mount the cutting mechanism (30) on the belt (10) to be cut, and cutting elements (42) for the seatbelt (10), situated inside the case, the cutting elements (42) include a wire (44) and elements for heating (46) the wire. A process for cutting a safety belt (10), includes using a wire (44) and elements for heating (46) the wire in order to cut the belt with the heated wire.

15 Claims, 5 Drawing Sheets

Figure 1:
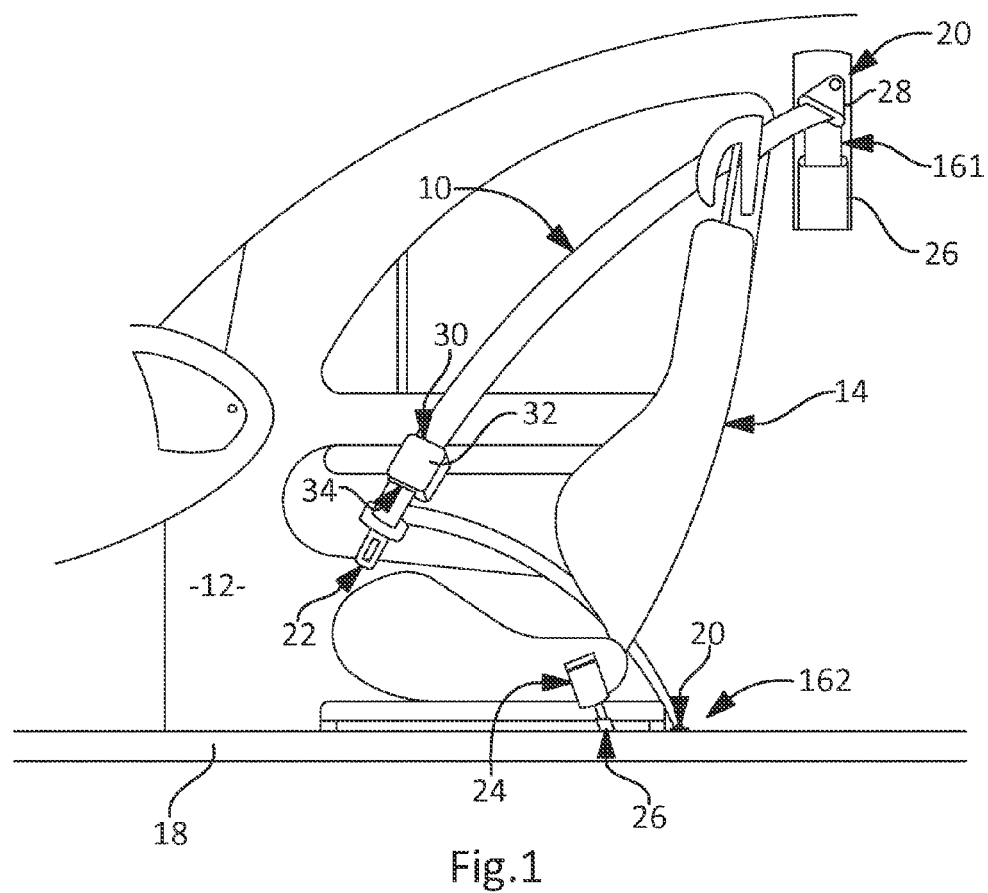

(52) U.S. Cl.
CPC ....... *B60R 2022/328* (2013.01); *Y10T 83/293* (2015.04); *Y10T 83/9292* (2015.04)

(58) Field of Classification Search
USPC ...... 83/171, 16, 586, 587, 651.1; 280/801.1; 180/268
See application file for complete search history.

(56) References Cited

U.S. PATENT DOCUMENTS

| | | | | |
|---|---|---|---|---|
| 4,174,015 | A | * 11/1979 | Farcinade | ............... B60R 22/32 180/268 |
| 4,532,681 | A | * 8/1985 | Baker | ................... B60R 22/322 228/191 |
| 4,610,653 | A | * 9/1986 | Savich | ................. B29C 65/229 156/515 |
| 5,395,136 | A | * 3/1995 | Buchner | ................. B60R 22/32 280/801.1 |
| 8,387,501 | B2 | * 3/2013 | Jordan | ..................... B26D 1/08 219/201 |
| 2010/0257983 | A1 | * 10/2010 | Jordan | ..................... B26D 1/08 83/13 |
| 2013/0014622 | A1 | * 1/2013 | Durham | ................... B26F 3/12 83/16 |

FOREIGN PATENT DOCUMENTS

| | | | | |
|---|---|---|---|---|
| EP | 0561355 | A1 | 9/1993 | |
| JP | S54 61727 | A | 5/1979 | |
| WO | WO 2005037615 | A1 * | 4/2005 | ............. B60R 22/32 |
| WO | 2013/043066 | A2 | 3/2013 | |

* cited by examiner

DEVICE FOR CUTTING A BELT

The present invention relates to a mechanism enabling a seatbelt to be cut in a vehicle to allow the belted passenger to free himself and leave the vehicle in an emergency.

Private vehicles as well as certain public transport vehicles are equipped with seatbelts designed to prevent passengers' bodies from being projected through the vehicle's windows, against the dashboard or against the seats, during an accident such as running off the road or collision with another vehicle.

In theory, after an accident and insofar as he is still conscious and is not seriously injured, each passenger can free himself from his seatbelt on his own by releasing the buckle of said seatbelt from its attachment, the attachment including a push button enabling the buckle to be released when it is pushed in.

However, several facts are liable to hinder the passenger from freeing himself from his seatbelt easily and quickly.

For example, most seatbelts are now equipped with grippers allowing the seatbelt attachment to be pulled backward during a collision, namely in order to tighten the belt and press the passenger's body against his seat.

Such grippers, located between the attachment of the belt and the point where said attachment is attached to the vehicle chassis, exert a tractive force on the belt, even after their actuation.

And that residual tractive force creates a force opposing the inward pushing movement of the push button, thus preventing the passenger from freeing himself easily, especially if he is weakened by the force of the collision.

At the same time, the other safety elements of the vehicle, such as the airbags, or certain sections or equipment of the vehicle deformed or moved due to the collision may hinder the passenger's movements and access to the push button of the attachment.

Lastly, following an accident, some passengers, panicked or weakened by the collision, may take quite a while to free themselves from their seatbelt on their own using the standard push button.

Various mechanisms have thus been envisaged to enable the passengers to free themselves easily and quickly after a collision or accident.

Document EP-0561355 provides for a simple cutting system, placed on the seatbelt and actuated by the passenger.

In greater detail, said cutting mechanism includes two sections clipped onto the seatbelt and inside of which a blade slides, and the movement of the blade causing the cutting of the seatbelt occurring when the passenger pulls on the mechanism using a grip ring provided at the end of the mechanism opposite the one equipped with the blade.

Although very simple to use, this cutting mechanism nevertheless requires decision-making and action by the passenger.

In addition, a seatbelt being designed to withstand tractive efforts of several tonnes, manually cutting the belt may demand too much effort for some passengers, weakened or having become incapable as a result of the accident.

Document WO-2013/043066 describes a cutting mechanism not requiring effort by the passenger.

According to that document, the cutting mechanism takes the form of a cylindrical body with an internal housing in which a sliding blade is mounted, and the cylindrical body also includes two slits to run the seatbelt through.

Advantageously, the blade is moved to cut the seatbelt using an explosive charge or a generating of gas triggered remotely by an electrical signal from the vehicle's electronics, preferably when the vehicle is finally immobile after a collision and at the end of a certain period after the impact.

A disadvantage of the cutting mechanism in that document WO-2013/043066 lies in the use of an explosive charge or a gas generator to move the blade.

On the one hand, such drive means can prove to be dangerous for the passengers of the damaged vehicle.

On the other hand, the chemical functioning of such drive means can change over time, which harms the quality and reliability of the cutting.

Lastly, the use of such means requires an enhanced and thus costly design of the body of the mechanism because the blade must be stopped in motion whereas the increase in pressure propels it at high speed and with a high degree of acceleration.

The present invention aims to mitigate the disadvantages of the prior art.

For this purpose, the present invention relates to a seatbelt cutting mechanism; the cutting mechanism includes a casing, a passage running through said casing and making it possible to mount the cutting mechanism on the seatbelt to be cut, and means of cutting the seatbelt, located inside the casing.

According to the invention, the cutting mechanism is characterised in that the cutting means include a wire and means for heating said wire.

Thanks to this design, the cutting means of the cutting mechanism according to the invention are less dangerous for the belted passenger than cutting means driven by explosive charge or gas release.

In addition, the use of a hot wire improves the quality of the cutting effected by the cutting means.

From the perspective of their operation, the wire being preferably heated by an autonomous electrical supply, such cutting means offer better reliability than chemically operated means.

Lastly, this design with a hot wire does not require a mechanically reinforced casing and turns out to be less costly.

At the same time, the invention also covers a seatbelt equipped with this cutting mechanism, as well as a process for cutting a seatbelt consisting of using a wire and means of heating said wire in order to cut said seatbelt with the heated wire.

Figure 2:
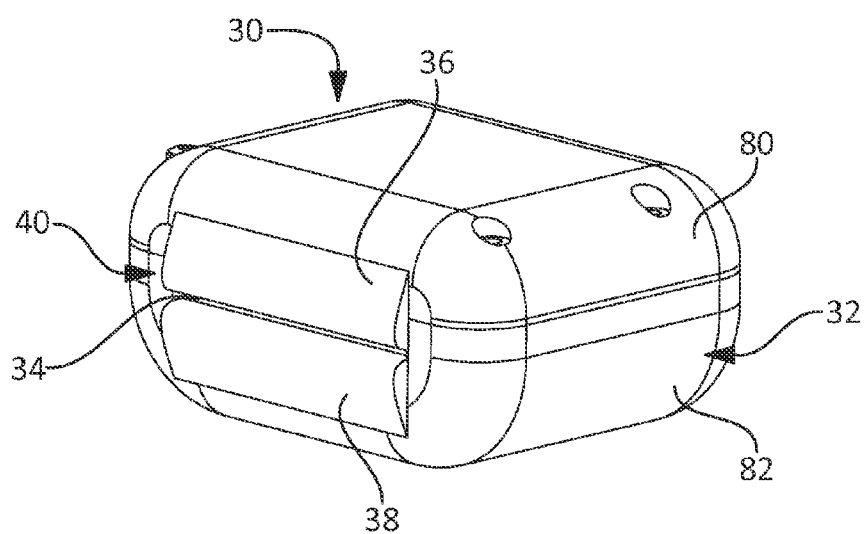
Figure 3:
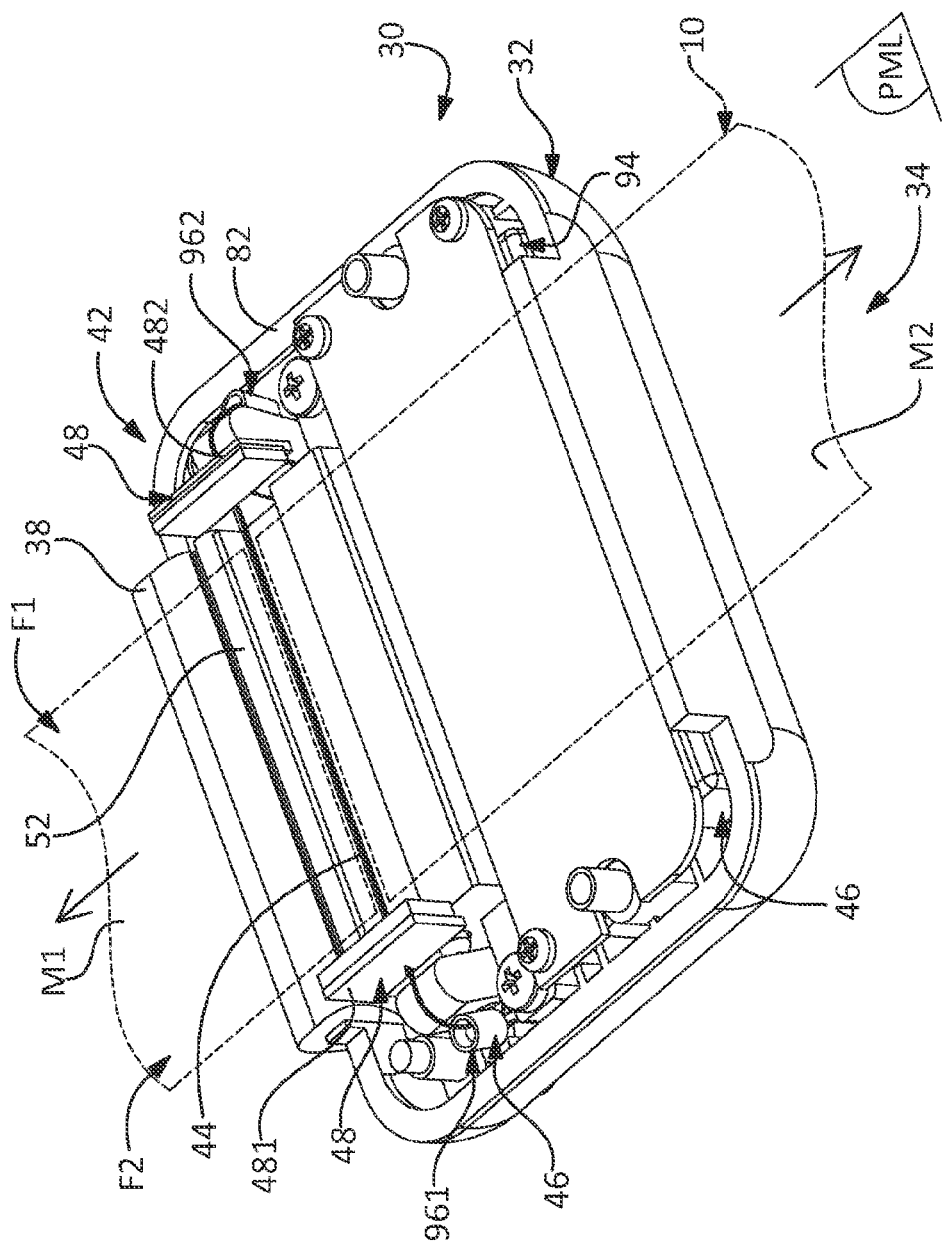
Figure 4:
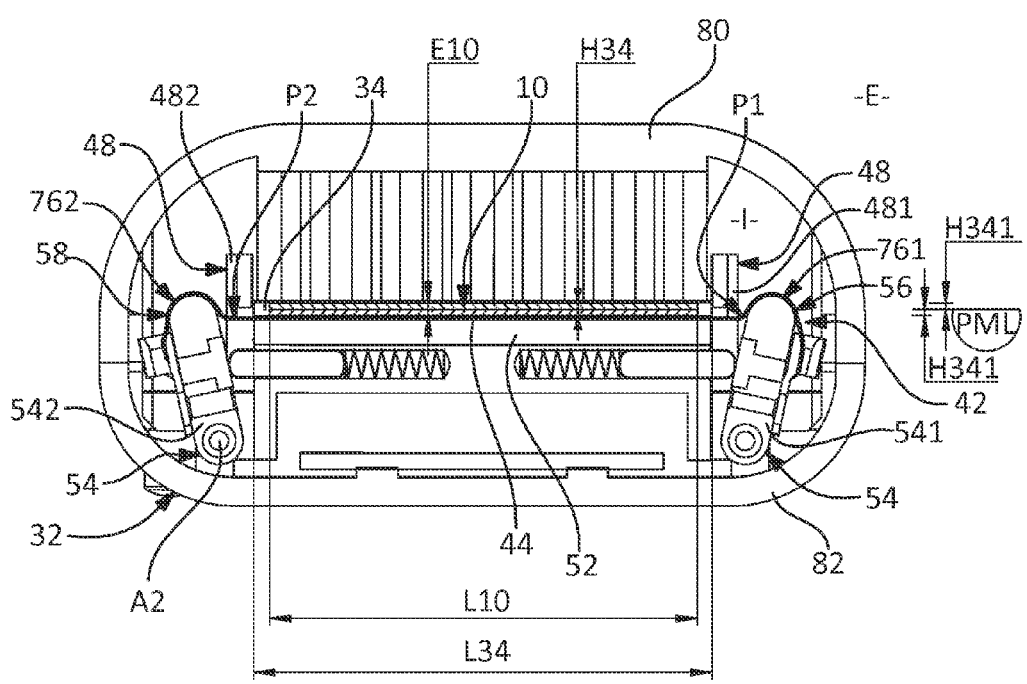
Figure 5:
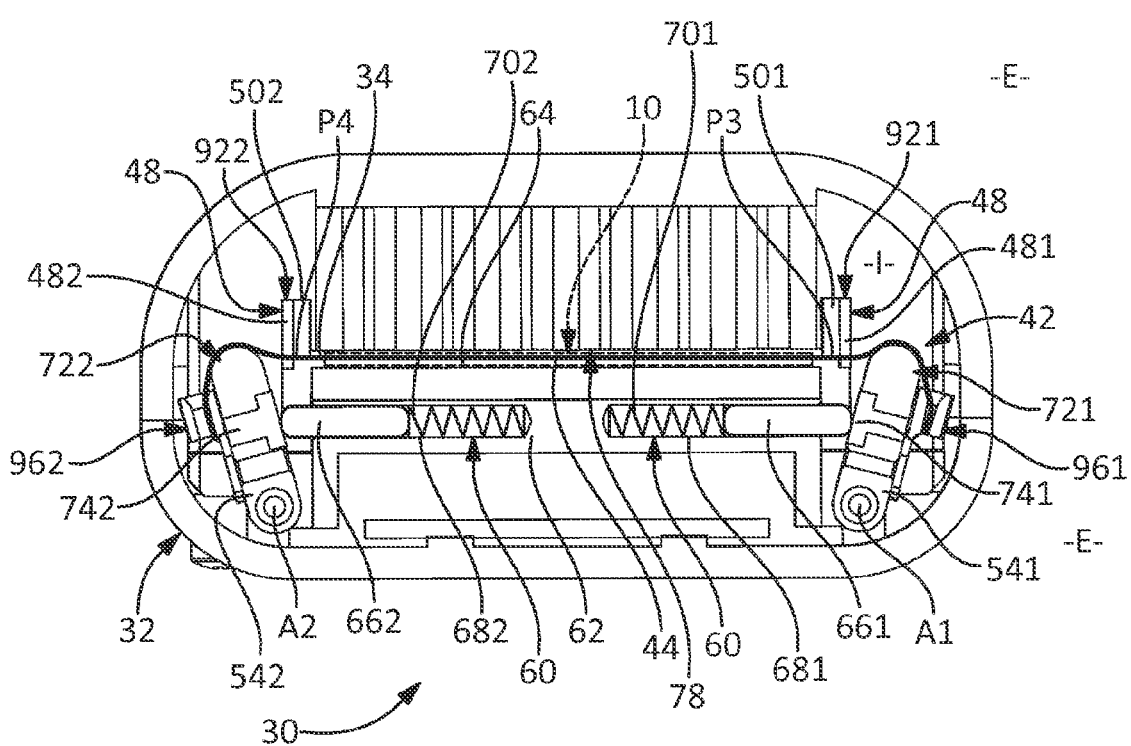
Figure 6:
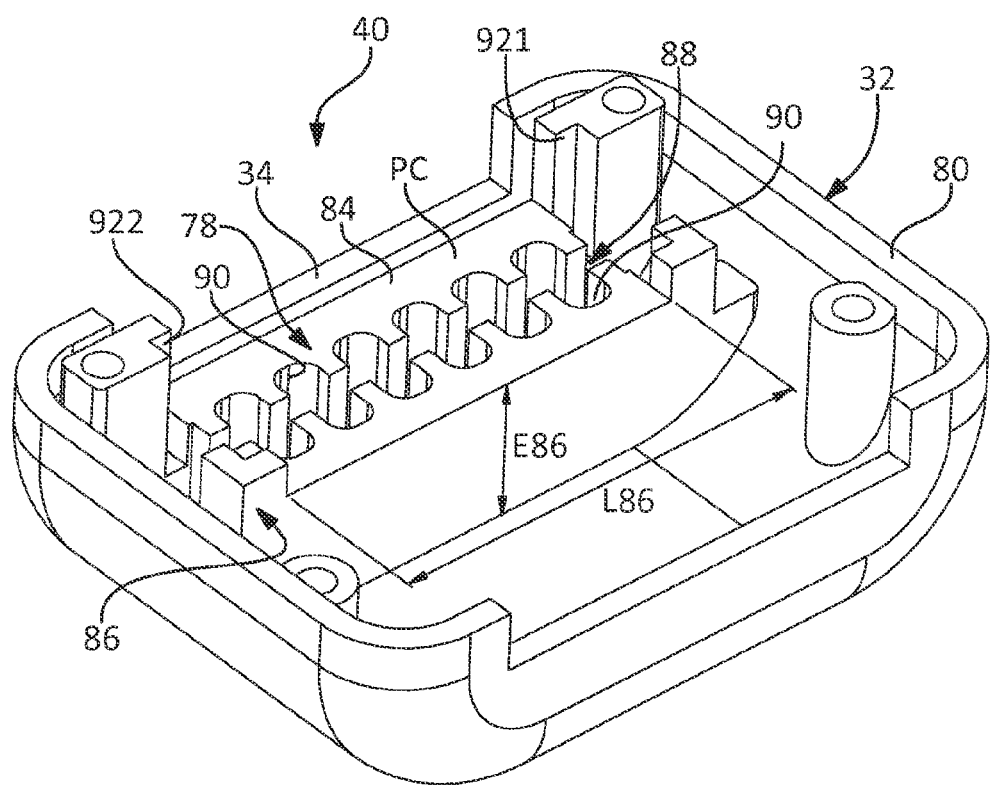

Other characteristics and advantages will be shown by the following description of the invention, a description provided only as an example, in comparison with the attached drawings in which:

FIG. 1 represents a side view of a vehicle passenger compartment in which a seatbelt is equipped with a cutting mechanism according to the invention, FIG. 2 shows a view in perspective of a cutting mechanism according to the invention, FIG. 3 shows a view in perspective of the cutting means and the lower half of the casing of a cutting mechanism according to the invention, FIGS. 4 and 5 represent cross-section views of the cutting means of a cutting mechanism according to, respectively with the wire of the cutting means in its passive state and in its active state, and FIG. 6 represents a view in perspective of the cutting means and the upper half of the casing of a cutting mechanism according to the invention.

As illustrated in FIG. 1, the present invention relates to the cutting of a seatbelt 10 provided in the passenger compartment 12 of a vehicle in order to prevent a passenger from being projected out of his seat 14 during an impact, said impact being due to an accident or running off the road.

In well-known manner, and depending on whether a two-point or three-point seatbelt is involved, the seatbelt 10 includes at least one end 161,162 connected securely to the chassis 18 of the vehicle through a fastening mechanism 20, and at least one buckle 22 connected securely to the chassis 18 of the vehicle by an attachment 24.

Said attachment 24 is also connected securely to the chassis 18 of the vehicle by a fastening mechanism 26.

And said attachment 24 includes means to hold the buckle 22 with a push button making it possible to release the buckle 22.

In the example shown in FIG. 1, the seatbelt 10 is three-point because it comprises two ends upper 161 and lower 162 connected securely to the chassis 18 of the vehicle, and the buckle 22 is mounted sliding between those two ends 161,162 in order to be able to adapt the length of the seatbelt 10 to the passenger's body size.

Advantageously, a coiler 26 and a loop 28, both connected securely to the chassis 18 of the vehicle, can be provided between the buckle 22 and the high end 161 of the seatbelt 10 so that the length of the seatbelt 10 adapts automatically to the passenger's body size.

In order to free the passenger from his seatbelt automatically after an impact, the present invention provides for a cutting mechanism 30 of said seatbelt 10.

As FIG. 2 illustrates in greater detail, said cutting mechanism 30 includes a casing 32, and a passage 34 running through said casing 32.

As can be seen in FIG. 1, the passage 34 running through makes it possible to mount the cutting mechanism 30 on the seatbelt 10 to be cut: the seatbelt 10 passing through the passage running through the casing 32.

Advantageously, the passage running through 34 makes it possible to mount the casing 32 in a sliding manner on the seatbelt 10. Thus, the cutting mechanism 30 can be moved by the passenger to a position on the seatbelt 10 in which it does not disturb his comfort.

Preferably, the cutting mechanism 30 is positioned between the buckle 22 of the seatbelt and one end 161,162 of the seatbelt 10 connected securely to the chassis 18 of the vehicle.

Thus, the cutting mechanism 30 may be positioned in the vicinity of the buckle 22 of the seatbelt 10 and so as to rest on the seat 14 and not on the passenger.

Advantageously, and in particular in the event that an end 161,162 of the seatbelt 10 is connected to the chassis 18 of the vehicle by a coiler 26, the cutting mechanism 30 includes upper 36 and lower joints 38 protecting the entrance 40 of the passage running through 34.

Such joints 36, 38, shown in FIG. 2 reduce the impact of the casing 32 against the coiler 26 or the loop 28 at the time of each coiling of the seatbelt 10 in the coiler 26, i.e., each time the passenger leaves the vehicle.

According to the invention, and as illustrated by FIGS. 3, 4 and 5, the cutting mechanism 30 includes means of cutting 42 the seatbelt 10 that are located in the interior I of the casing 32.

According to an important characteristic of the invention, the cutting means 42 include a wire 44 and a means of heating 46 of said wire.

In a general manner, the present invention covers a process for cutting a seatbelt 10 in which wire 44 is used when it is hot in order to cut the belt 10 in the interior I of the casing 32.

According to this cutting process, the wire 44 and the means of heating 46 of said wire are used to cut the belt 10 with the heated wire 44.

As illustrated in FIG. 4, the wire 44 takes a passive state in which the wire 44 is away from the seatbelt 10.

And, as illustrated in FIGS. 3 and 5, the wire 44 also takes an active state in which the wire 44 is heated by the means of heating 46 and touching the belt 10 in order to cut it.

Thus, the wire 44 is by default in its passive state, and it goes into its active state only when the belt 10 must be cut after a collision, and preferably after having allowed a certain time to elapse after the vehicle has stopped moving.

In a preferred method of implementing the cutting means 42, the active state of the wire 44 corresponds to an active position taken by the wire 44, illustrated in FIGS. 3 and 5, different from a passive position, illustrated in FIG. 4, taken by the wire 44 and corresponding to the passive state of said wire 44.

Thus, and still in a preferred method of implementation of the cutting means 42, the wire 44 is maintained in its passive position by at least one low melt element 48, and the wire 44 goes from its passive position to its active position when said wire 44 is heated and the low melt element or elements 48 at least partially melt under the effect of the heat of the wire 44.

In greater detail, since the wire 44 moves toward the belt 10 when it goes from its passive position to its active position, at least one low melt element 48 comes to rest against the wire 44 so as to keep said wire 44 away from the seatbelt 10 when said low melt element or elements 48 are not melted and when said low melt element or elements 48 releasing the wire 44 in such a way that the wire 44 moves toward the belt 10 when said low melt element or elements 48 at least partially melt.

In a preferred method of construction of said low melt means of support on the wire 44, two low melt elements 481,482 situated on each side of the traversing passage 34 create, respectively, two points of support P1, P2 on the wire 44 making it possible to remove the wire 44 from the seatbelt 10 when said two low melt elements 481,482 are not melted.

In the present invention, the moving of the means of cutting the seatbelt 10, namely the wire 44, from their passive position to their active position is thus simply obtained by the ability of the low melt elements 48,481,482 to melt under the effect of the heat of the wire 44.

Advantageously, said low melt elements to move the wire 44 provide operation that is reliable over time, not dangerous and not needing a mechanically strengthened design of the casing 32 of the cutting mechanism 30.

In addition to the low melt elements 48,481,482, and in order to position the wire 44 when it is heated in the best active position for cutting the seatbelt 10, the cutting means 42 include two stops 501,502 situated on each side of the traversing passage 34.

Those two stops 501,502 are respectively appended to the low melt elements 481,482, and they create, respectively, two points of support P3, P4 on the wire 44.

Since the traversing passage 34 extends parallel to a longitudinal median plane PML of the casing 32 and at a height H341 that is equal on each side to said longitudinal median plane PML, the two points of support P3, P4 created by the two stops 501,502 make it possible to stop the movement of the wire 44 so as to largely maintain said wire 44 in the longitudinal median plane PML of the traversing passage 34.

Preferably, the cutting mechanism 30 includes in interior I of the casing 32 at least one element, such as a transversal joint 52 visible in FIGS. 3 and 4, allowing the belt 10 to be maintained parallel to the longitudinal median plane PML of the casing 32 and in such a way that the thickness E10 of the seatbelt extends equally on each side of said longitudinal median plane PML.

Thus, when the low melt elements 481,482 melt and release the wire 44, the wire 44 is largely stopped in the longitudinal median plane PML of the casing 32 and thus in the middle of the thickness E10 of the seatbelt 10, which improves the quality and reliability of the cut.

To be put in motion from its passive position to its active position, the wire 44 could be produced in an elastic, deformable material: the wire 44 being arranged relative to the stops 501,502 in such a way that its release by the melting, even partial, of the low melt elements 481,482 allows it to return to its initial shape and to its active position.

However, in a preferred method of implementation of the cutting means 42, the wire 44 is moved to the active state, and thus to its active position, by at least one wire-strainer 54 pulling on one of the ends 56, 58 of the wire.

More precisely, the wire-strainer 54 leads said end 56, 58 of the wire at least to the level of the longitudinal median plane PML of the casing 32.

To guarantee the quality and reliability of the cut of the seatbelt 10, it is preferable for the wire-strainer 54 to lead the end 56, 58 of the wire above the longitudinal median plane PML of the casing 32. Thus, the central portion 64 of the wire 44 running through the traversing passage 34 completely runs through the thickness E10 of the seatbelt 10.

To better improve the quality and reliability of the cutting of the seatbelt 10, the cutting means 42 include two wire-strainers 541,542 situated on each side of the traversing passage 34 and pulling respectively on the two ends 56, 58 of the wire 44.

In making it possible to tackle the cutting of the seatbelt 10 on its two lateral sides F1, F2, said pair of wire-strainers 541,542 reduces the risk of the two pieces M1, M2 of the seatbelt 10 cut by the wire 44 remaining connected along one of the sides F1, F2 of the seatbelt 10.

Advantageously, the two wire-strainers 541, 542 maintain, respectively, the two ends 56, 58 of the wire 44 above the longitudinal median plane PML of the casing 32 when the wire 44 is in the active state, as well as in the passive state. It is thus ensured that the wire 44 indeed comes to rest on the low melt elements 481, 482 when it is in the passive position and that said wire indeed comes to rest on the stops 501, 502 when it is in the active position.

In a particular method of construction, the wire-strainers 541, 542 are mounted rotatable relative to a central body 62 of the cutting means 42 and around axes A1, A2 parallel to the longitudinal median plane PML.

In addition, the wire-strainers 541, 542 are constantly pushed back to the outside E of the casing 32 by retaining means 60 mounted between said central body 62 and said wire-strainers 541, 542.

Thus, when the low melt elements 481, 482 release the wire 44, the upper ends 721, 722 of said wire-strainers 541, 542 are driven to the outside E of the casing 32, and, consequently, the central portion 64 of the wire 44 is driven to the level of the longitudinal median plane PML and the wire 44 is indeed resting on the stops 501, 502.

The retaining means 60 are preferably in the form of two pins 661, 662 mounted sliding in two blind holes 681, 682 provided in the central body 62 of the cutting means 42, and two springs 701,702 placed in the bottom of the blind holes 681, 682, behind the pins 661, 662.

It is also preferable, since the means of heating 46 the wire 44 are electrical, for the wire-strainers 541, 542 to be electrically isolated from the pins 661, 662 by inserts 741,742 provided in the wire-strainers 541, 542 at their point of contact with said pins 661, 662.

In the design of the cutting means 42 according to the invention:
  the low melt elements 481, 482 form points of support P1, P2 on the wire 44 situated below the longitudinal median plane PML of the casing 32 as long as said low melt elements 481, 482 are not subjected to the heat of the wire 44,
  the stops 501, 502 form points of support P3, P4 on the wire 44 situated in the longitudinal median plane PML of the casing 32 when the low melt elements 481, 482 are subjected to the heat of the wire 44, and
  the tops 761, 762 of the upper ends 721, 722 of the wire-strainers 541, 542 are situated above the longitudinal median plane PML of the casing 32 and above the points of support P1, P2 and P3, P4 formed by the low melt elements 481, 482 and the stops 501, 502 when the wire 44 is in its active state as well as when the wire 44 is in its passive state.

To reduce the encumbrance of the cutting means 42, the wire-strainers 541, 542 are mounted outside of the low melt elements 481, 482 and the stops 501, 502.

And, in order to prevent contact between the melting materials of the low melt elements 481, 482 when the wire 44 is heated, said low melt elements 481, 482 are mounted outside of the stops 501, 502.

In a preferred method of construction of the cutting means 42, with the height H34 of the traversing passage 34 running perpendicular to the longitudinal median plane PML, and its width L34 running parallel to the longitudinal median plane PML, the wire 44 runs parallel to the longitudinal median plane PML and within the width L34 of the traversing passage 34.

Thus, with the thickness E10 of the seatbelt 10 situated within the height H34 of the traversing passage 34 and its width L10 situated within the width L34 of the traversing passage 34, the wire 44 moves within the height H34 of the traversing passage 34 and touches the entire width L10 of the seatbelt 10 when it is led from its passive position to its active position, which favours the cutting of the seatbelt 10.

Given said positioning of the wire 44 within the width L34 of the traversing passage 34, it follows from this that the wire-strainers 541, 542, the low melt elements 481, 482 and the stops 501, 502 are mounted on each side of the width L34 of the traversing passage 34.

Still with the objective of improving the cutting of the seatbelt 10 by the wire 44, the upper surface 78 of the traversing passage 34 takes the form of a cutting plane PC visible in FIG. 6 and towards which the wire 44 goes when it moves from its passive position to its active position.

Said cutting plane PC makes it possible to prevent the belt 10 from escaping under the ascent of the wire 44 when it is heated, and, with the contribution of the stops 501, 502, said cutting plane PC makes it possible to ensure that the wire 44 positions itself largely within the thickness E10 of the seatbelt when it is heated and that it carries out the cutting.

Preferably, said cutting plane PC allows the belt 10 to be maintained largely in the horizontal median plane PML in which the wire 44 is situated in active position.

Advantageously, the transversal joint 52 makes it possible to press, and even to compress, the belt 10 against the upper surface 78 when the casing 32 is closed and assembled.

In greater detail, at the definitive closing of the casing 32, the belt 10 is gripped between the transversal joint 52 and the upper surface 78, and the transversal joint 52 deforms so as to create pressure uniformly spread out over the belt 10.

Owing to said deformation and said pressure of the joint 52, the belt 10 is largely immobilised in the casing 32, and the casing 32 remains movable and adjustable in position on said belt 10.

Since the case 32 is broken down into two upper and lower halves 80, 82, assembled one against the other along their peripheral edges, the cutting plane PC is constituted by the lower surface 84 of a block 86 integral with the upper half 80 of the casing 32, the central body 62 on which are mounted the wire 44, the wire-strainers 541, 542, the low melt elements 481, 482 and the stops 501, 502 being integral with the lower half 82 of the casing 32.

In order to limit the transfer of heat from the wire 44 in active position to the block 86, and thus to the upper half 80 of the casing 32, the cutting plane PC is crossed by a groove 88 situated opposite the wire 44.

Said groove 88 is preferably wider than the wire 44, and said groove 88 is implemented in the entire thickness E86 of the block 86 and throughout its width L86 likely to touch the wire 44 in active position.

In addition, and still in order to limit the transfer of heat from the wire 44 to the upper half 80 of the casing 32, the cutting plane PC includes recesses of material 90 on each side of the groove 88.

At the same time, and as illustrated by FIGS. 4 to 6, the block 86 includes lateral notches 921 and 922 in which the low melt elements 481, 482 and the stops 501, 502 are housed, said low melt elements 481, 482 and said stops 501, 502 being maintained in the notches 921 and 922 by the wire 44 when the two upper and lower halves 80, 82 of the casing 32 are assembled one against the other.

According to the invention, the means of heating 46 the wire 44 are electrical and autonomous.

By autonomous, the invention means that said method of heating 46 have their own electric power supply, independent of the electric power supply of the vehicle.

For this purpose, said means of heating 46 include a battery 94, visible in FIG. 3, installed in the lower half 82 of the casing 32, next to the cutting means 42.

In order to supply the wire 44, the battery 94 is connected to the wire 44 through the wire-strainers 541, 542, and more specifically through pods 961, 962 provided on the wire-strainers and in which the ends 56, 58 of the wire 44 are set.

Of course, control means are provided in order to supply electricity to the wire 44 with the battery 94 only when the belt 10 must be cut.

Since the wire 44 is preferably made of stainless steel, the invention provides for supplying electricity, and thus heating the wire 44, for at least 25 seconds, which makes it possible to heat the wire 44 to a temperature of approximately 315° Celsius with a battery 94 capable of delivering approximately 6000 mAh.

With a wire 44 at such a temperature, it is ensured that the material of the seatbelt 10, generally nylon-based, melts and retracts, which makes it possible to separate the belt 10 into two pieces M1 and M2 reliably.

Lastly, in a preferred method of construction of the cutting means 42, the wire-strainers 541, 542, the central body 62, the stops 501, 502 and the pins 661, 662 are made of metal, whereas the casing 32 is rather made of a plastic, i.e., a polymer-based material.

Eventually, the cutting mechanism 30 according to the invention could also be used on a seatbelt 10 located somewhere else than in a vehicle and, for example, used to maintain a user's body on a machine, or on a safety harness.

The invention claimed is:

1. Cutting mechanism (30) for cutting a seatbelt (10), the cutting mechanism (30) including a case (32), a passage (34) traversing said case and making it possible to mount the cutting mechanism (30) on the seatbelt (10) to be cut, and of a cutting means (42) of the seatbelt (10) situated in interior (I) of the case, wherein the cutting means (42) includes a wire (44) and a heater for heating (46) said wire, wherein the wire (44) takes a passive state in which the wire (44) is away from the seatbelt (10), and an active state in which the wire (44) is heated by the heater (46) and touches the belt (10) in order to cut it, and wherein the active state of the wire (44) corresponding to an active position taken by the wire (44) different from a passive position taken by the wire (44) and corresponding to the passive state of said wire (44), the wire (44) is maintained in its passive position by at least one low melt element (48, 481, 482), and in which the wire (44) goes from its passive position to its active position when said wire (44) is heated and the low melt element or elements (48, 481, 482) at least partially melt under the effect of the heat of the wire (44).

2. Cutting mechanism (30) for a seatbelt (10) according to claim 1, wherein with the wire (44) moving towards the seatbelt (10) when it goes from its passive position to its active position, at least one low melt element (48, 481, 482) comes to rest against the wire (44) so as to keep said wire (44) removed from the seatbelt (10) when said low melt element or elements (48, 481, 482) are not melted, and said low melt element or elements (48, 481, 482) releasing the wire (44) in such a way that the wire (44) moves toward the seatbelt (10) when said low melt element or elements (48, 481, 482) at least partially melt.

3. Cutting mechanism (30) for a seatbelt (10) according to claim 2, wherein two low melt elements (481, 482) situated on each side of the traversing passage (34) create, respectively, two points of support (P1, P2) on the wire (44) making it possible to remove the wire (44) from the seatbelt (10) when said two low melt elements (481,482) are not melted.

4. Cutting mechanism (30) for a seatbelt (10) according to claim 3, wherein with the traversing passage (34) running parallel to a longitudinal median plane (PML) of the case (32) and at a height (H341) equal on each side of said longitudinal median plane (PML), a cutting means (42) include two stops (501, 502) situated on each side of the traversing passage (34), respectively appended to the low melt elements (481, 482), and creating, respectively, two points of support (P3, P4) on the wire (44), the two points of support (P3, P4) created by said two stops (501, 502) making it possible to stop the movement of the wire (44) so as to maintain said wire (44) in the longitudinal median plane (PML) of the traversing passage (34).

5. Cutting mechanism (30) for a seatbelt (10) according to claim 1, wherein the wire (44) is moved to the active state by at least one wire-strainer (54, 541, 542) pulling on one of the ends (56, 58) of the wire.

6. Cutting mechanism (30) for a seatbelt (10) according to claim 5, wherein a cutting means (42) include two wire-strainers (541, 542) situated on each side of the traversing passage (34) and pulling respectively on the two ends (56, 58) of the wire (44).

7. Cutting mechanism (30) for a seatbelt (10) according to claim 1, wherein the traversing passage (34) running parallel to a longitudinal median plane (PML) of the case (32) and at a height (H341) equal on each side of said longitudinal median plane (PML), the height (H34) of the traversing passage (34) running perpendicular to the longitudinal median plane (PML), and the width (L34) of the traversing passage (34) running parallel to the longitudinal median plane (PML), the wire (44) runs parallel to the longitudinal median plane (PML) and within the width (L34) of the traversing passage.

8. Cutting mechanism (30) for a seatbelt (10) according to claim 1, wherein an upper surface (78) of the traversing passage (34) takes the form of a cutting plane (PC) to which the wire (44) goes when it goes from its passive state to its active state.

9. Cutting mechanism (30) for a seatbelt (10) according to claim 8, wherein the cutting plane (PC) is crossed by a groove (88) situated opposite the wire (44).

10. Cutting mechanism (30) for a seatbelt (10) according to claim 9, wherein the cutting plane (PC) includes recesses of material (90) on each side of the groove (88).

11. Cutting mechanism (30) for a seatbelt (10) according to claim 1, wherein the heater for heating (46) the wire (44) is electrical.

12. Seatbelt (10) having a cutting mechanism (30) according to claim 1, mounted thereon, the seatbelt (10) running in the passage (34) running through the case (32) of the cutting mechanism.

13. Seatbelt (10) according to claim 12, the traversing passage (34) making it possible to mount the case (32) sliding on the seatbelt (10), and the seatbelt (10) including a buckle (22) intended to be connected movably to the chassis (18) of the vehicle, and one end (161, 162) intended to be connected in fixed manner to the chassis (18) of the vehicle, in which the cutting mechanism (30) is positioned between the buckle (22) and the end (161, 162) of the seatbelt (10) connected in fixed manner to the chassis (18) of the vehicle.

14. Process for cutting a seatbelt (10), which comprises:
providing the cutting mechanism of claim 1,
positioning the wire in the passive position with the low melt element;
heating the wire to melt the low melt element;
moving the wire to the active position made available by melting the low melt element; and
using the wire (44) when it is hot and in its active position to cut the seatbelt (10).

15. Process for cutting a seatbelt (10) according to claim 14, which comprises of using the wire (44) and the heater for heating (46) said wire in order to cut said seatbelt with the heated wire (44).

\* \* \* \* \*